July 30, 1963 HIROSHI MATSUURA 3,099,415

REEL FOR A FILM, TAPE AND THE LIKE

Filed July 13, 1960

Hiroshi MATSUURA
INVENTOR.

BY Leon M. Strauss AGT.

United States Patent Office 3,099,415

Patented July 30, 1963

3,099,415

REEL FOR A FILM, TAPE AND THE LIKE

Hiroshi Matsuura, Toshima-cho, Chiyoda-ku, Tokyo, Japan

Filed July 13, 1960, Ser. No. 42,581

Claims priority, application Japan Oct. 31, 1959

2 Claims. (Cl. 242—74.2)

Figures 1, 2, 3:
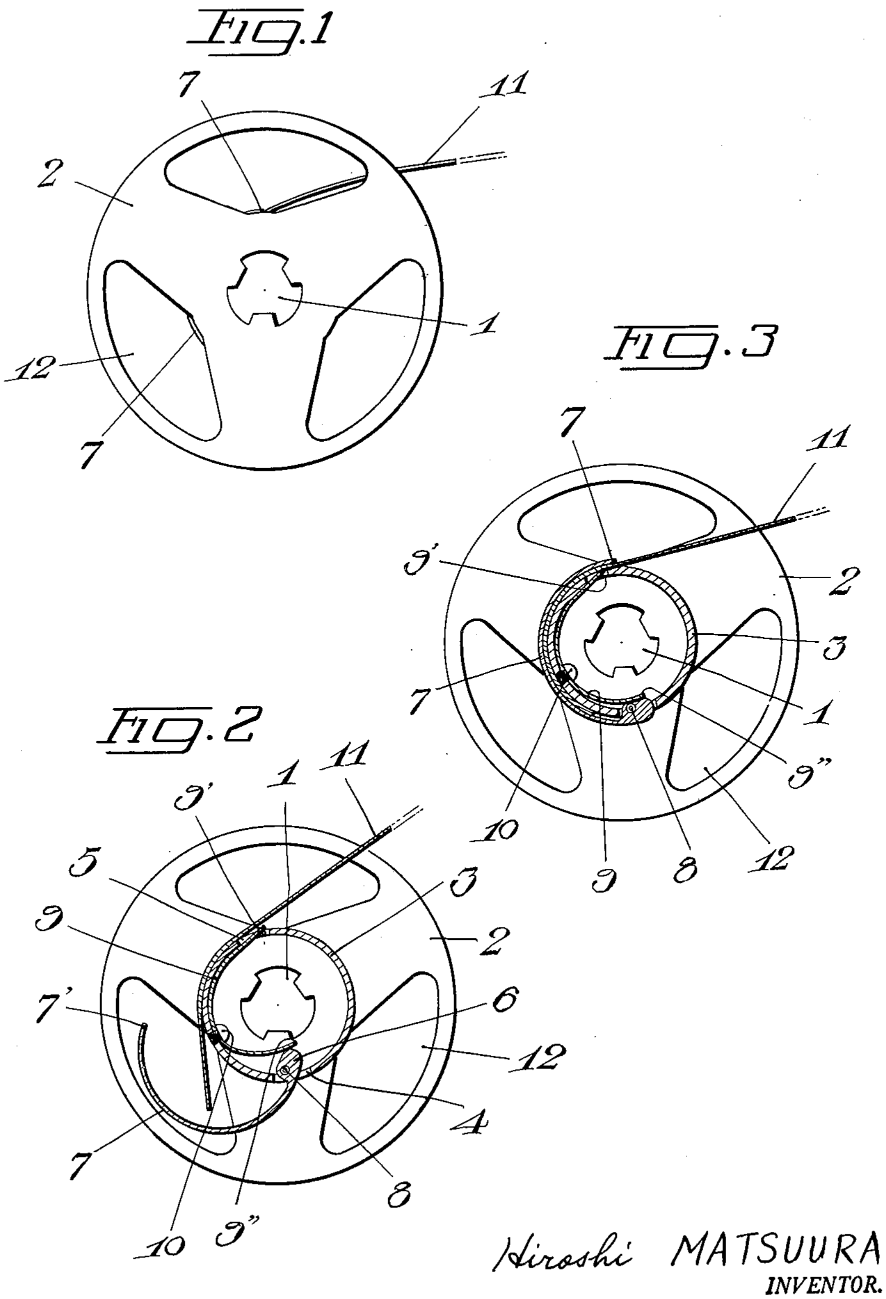

The present invention is related to a reel for a film, tape and the like.

It is an object of the present invention to provide a reel for a film, tape and the like on which a film, tape and the like can easily be secured and detached in winding or rewinding to and from the reel.

It is another object of the present invention to provide a reel for a film, tape and the like on which a film, tape and the like can securely be held by means of a spring biased holding plate.

It is further an object of the present invention to provide a reel for a film, tape and the like which is suitable for a mass production and accordingly can be manufactured at a low cost.

With these and other objects in view and hereinafter set forth, preferred embodiments of the present invention are fully described in the ensuing specification and delineated in the claims appended hereto.

In the drawings:

FIG. 1 is a side elevation view of one form of reel embodying the invention; and FIGS. 2 and 3 are diametric sectional views through the reel shown in FIG. 1, FIG. 2 showing the reel in the "open" condition and FIG. 3 showing the reel in the "closed" condition.

Now explaining the embodiment of the present invention with reference to the attached drawings, as illustrated in FIGS. 2 and 3, there is provided a tubular winding shaft 3, having holes 4 and 5 through its tubular walls. Side plates 2 are attached to the respective opposite ends of the shaft 3, and each side plate has a central aperture 1. At the hole 4, a film holding plate 7, having a cam end 6, is attached by means of a pivot 8. Film holding plate 7 is constructed so as to fit the contour of winding shaft 3, and so that the tip 7′ thereof may cover the hole 5. Furthermore, within the winding shaft 3, a leaf spring 9 is fixed by means of a screw at its center and an end 9′ thereof extends into the hole 5. The other end 9″ of leaf spring 9 resiliently presses against the cam end 6 of the film holding plate 7.

In the embodiment of the invention, 11 is a movie film or a tape of a tape recorder, and 12 indicates windows or openings in plates 2.

In the conventional construction of reels of this type, a slot has been provided in the winding shaft between the side plates, and an end of a film or tape is inserted into the slot in winding a film or tape on the reel. A disadvantage of the conventional construction is that the film or tape thus wound is apt to be separated from the reel at the initial step of winding onto said reel as well as at the last stage of winding back the film onto other reels.

The object of the present invention is to overcome this disadvantage by securely holding a film or tape to a reel by a spring means.

In the use of the reel constructed according to the invention, the film holding plate 7 is opened, as is shown in FIG. 2, and the end of a film or tape 11 is placed around the winding shaft 3 after which the film holding plate 7 is closed. The film or tape 11 is thus held securely between the winding shaft 3 and the film holding plate 7, the cam end 6 of the film holding plate 7 being pressed by end 9″ of the leaf spring 9 to bias the film holding plate 7 firmly toward the winding shaft 3. By means of the other end 9′ of the leaf spring 9, the film or tape 11 is pressed from the interior towards the tip 7′ of the film holding plate 7, and thus the film or tape is even more tightly secured.

Furthermore, due to the simple construction of the present invention, as described above, the reel according to the present invention is suitable for mass production and accordingly can be manufactured at a low cost.

While I have illustrated and described the preferred embodiment of my invention, it is to be understood that I do not limit myself to the precise construction herein disclosed and the right is reserved to all changes and modifications coming within the scope of the invention as set forth in the appended claims.

Having thus described my invention, what I claim as new and desire to secure by United States Letters Patent is:

1. A winding reel for a film, tape or the like, comprising a tubular shaft having a pair of circumferentially spaced openings in its tubular wall; a pair of side plates each secured to a respective end of said tubular shaft; an arcuate film clamping plate element curved to conform to the exterior surface of said tubular shaft, said clamping plate element having an end extending through one of said openings and pivoted to said tubular shaft with said end forming a cam extending inwardly from the pivot axis; the free end of said clamping plate element, when the latter is in clamping position, extending over the surface of said shaft beyond the other opening; and a leaf spring element secured to the tubular wall of said shaft to extend circumferentially of the inner surface of said tubular wall and having a free end engageable with said cam to bias said clamping plate element to firmly engage a film, tape, or the like wound over the outer surface of said shaft to firmly hold the film, tape or the like against said shaft surface; one of said elements having a portion extending through the other opening for clamping engagement with the film, tape or the like to hold the same against the other of said elements through the opening.

2. A winding reel, as claimed in claim 1, in which said leaf spring element is secured to the inner surface of said shaft intermediate its ends, and has a second free end extending through such other opening to constitute said portion.

References Cited in the file of this patent

UNITED STATES PATENTS

| | | |
|---|---|---|
| 242,188 | Cuff | May 31, 1881 |
| 816,490 | Mills | Mar. 27, 1906 |
| 869,902 | Harbeck | Nov. 5, 1907 |
| 960,795 | Bircher | June 7, 1910 |
| 1,089,082 | Rees | Mar. 3, 1914 |
| 1,333,906 | De Villers | Mar. 16, 1920 |
| 1,497,166 | Canfield | June 10, 1924 |
| 1,599,484 | Penin | Sept. 14, 1926 |
| 2,336,189 | Price | Dec. 7, 1943 |
| 2,829,844 | Larson | Apr. 8, 1958 |

FOREIGN PATENTS

| | | |
|---|---|---|
| 14,750 of 1889 | Great Britain | Sept. 19, 1889 |